Figure 1:
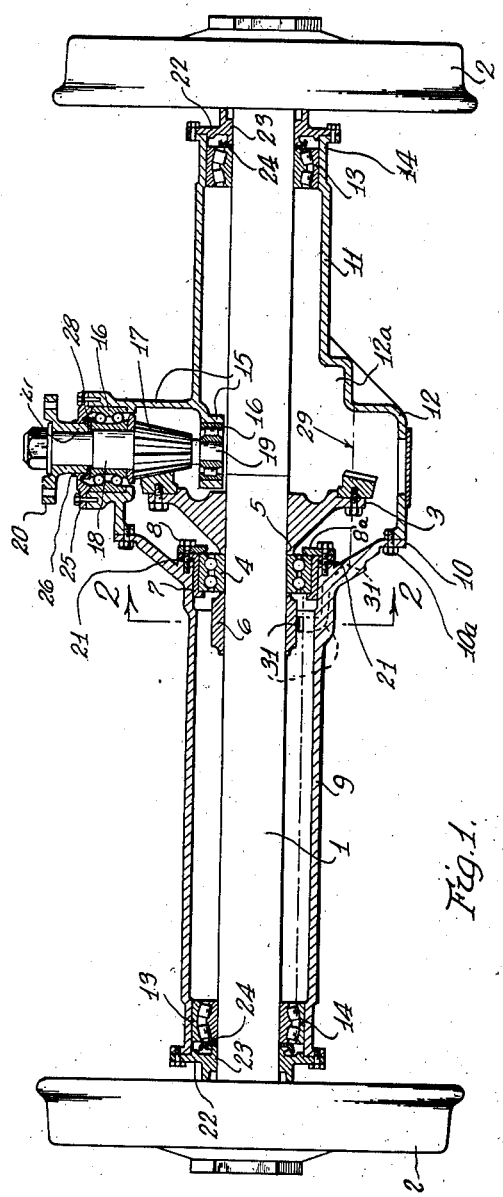

Nov. 23, 1943.  E. H. PIRON  2,335,080
AXLE ASSEMBLY
Filed Nov. 29, 1940

INVENTOR.
Emil H. Piron
BY
ATTORNEY

Patented Nov. 23, 1943

2,335,080

UNITED STATES PATENT OFFICE 2,335,080

AXLE ASSEMBLY

Emil H. Piron, New York, N. Y., assignor to Transit Research Corporation, a corporation of New York Application November 29, 1940, Serial No. 367,830

4 Claims. (Cl. 74—424)

This invention relates to an axle assembly for street car trucks and has for its primary object to provide an axle assembly of comparatively light weight and which may be readily assembled and disassembled in construction as well as in maintenance work.

A street car axle assembly such as here contemplated comprises an axle having a wheel on each end thereof. A hypoid gear is pressed on the axle for mesh with a driving pinion, and an axle housing is provided having two journal bearings with one adjacent each wheel, a center bearing adapted to prevent movement of the axle axially as well as radially to maintain the gears in proper meshing relationship, and bearings for a drive shaft which carries the driving pinion.

An object of this invention is to form a two-part axle housing, with one part designed to cover the center bearing and one journal bearing and the other part being designed to cover the gearing and the journal bearing at the other end of the axle. The two parts are detachably secured together by bolts.

Another object is to provide means for mounting the center bearing in one housing part in such manner that the hypoid gear may be placed in proper mesh with the driving pinion. In this respect the center bearing is retained by a ring bolted therearound, and its position may be corrected by use of shims, when correction is found necessary.

Another object is to provide an axle assembly wherein the two housing parts may be assembled in place after the hypoid gear and the bearings have been assembled in place on the axle, and the pinion mounted in its bearings in one part of the housing. This permits the axle assembly to be watched during the act of assembly and therefore eliminates blind assembly. It also has an advantage in that it permits removal of the two housing parts without disassembling the bearings from the axle. The center bearing, during assembly, is in plain view, and when shims must be used in conjunction therewith, may be easily inserted in place and the necessary checks as to accuracy may be easily made.

Another object of the invention is to provide for efficient lubrication of the assembly. In this respect the invention provides for the splashing of oil by the hypoid gear to lubricate the bearings automatically. At one end of the housing the journal bearing is lubricated by the mist produced by the hypoid gear splashing the oil, and excess oil may flow back freely, to the portion of the housing enclosing the gear. At the other end of the axle oil reaches the journal bearing by being splashed through the center bearing, and accumulates in the end portion of the housing until it reaches a level such that at least the lowermost roller of the journal bearing assembly receives some oil. This oil level is maintained by two oil returns which are so disposed with respect to the axle as to prevent accumulation of excessively high oil levels when a vehicle is travelling on grades.

Figure 2:
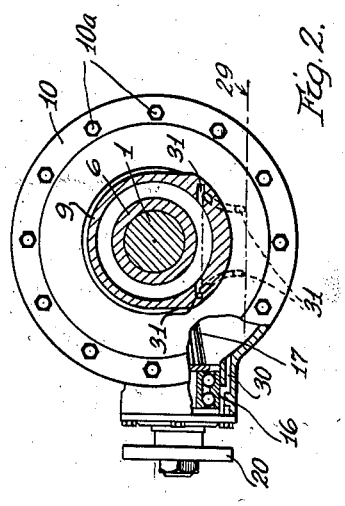

Other objects and advantages will become more fully apparent as reference is had to the accompanying drawing wherein my invention is illustrated, and in which Fig. 1 is a longitudinal, horizontal cross section of an axle assembly, and Fig. 2 is a section taken on the line 2—2 of Fig. 1.

More specifically, 1 designates an axle shaft having rail vehicle wheels 2 secured upon respective ends. The wheels are preferably of the resilient type now in common use on street cars but may be of any special or conventional type. It is essential that the wheels be removable from the axle, and that they be removed from the axle during assembly and disassembly.

A hypoid gear 3 is pressed on the axle shaft 1 and a central thrust bearing 4 is retained against movement in one direction axially of the axle shaft by abutment against the hub 5 of the gear 3. The bearing 4 is held against movement in the other direction by a ring or collar 6, which is secured to the axle shaft 1. The center bearing 4 has a ring 7 secured therearound by bolts 8 and by a ring 8a which also act to secure the ring to the housing hereinafter described.

The axle housing is formed in two sections. One section comprises a substantially tubular portion 9 having an enlarged end flange 10. The other section comprises a tubular portion 11 and an enlarged drum 12 for housing the gears. The flange 10 is bolted to the drum 12 as indicated at 10a, in final assembly, and the ring 7, above described, is secured to the flange 10 by the bolts 8. The axle is thus supported centrally by the bearing 4, and is held against both radial and axial movement relative to the housing. Journal bearings 13 are mounted on the axle shaft 1 and are received in portions 14 of reduced diameter at the outer ends of the housing portions 9 and 11.

The drum 12 has an extended portion 15 receiving and supporting two axially spaced bearings 16. A pinion gear 17 has a stub shaft 18 received in one of the bearings 16 and an axial pilot 19 received in the other bearing. When the drum 12 is bolted to the flange 10 the hypoid gear and the pinion gear are held in mesh, and the axle with its wheels are driven by rotation of the pinion. The shaft 18 has a coupling element 20 secured thereto and adapted to be connected to a propeller shaft.

With the portions 14 of smaller diameter than the remainder of both tubular portions 9 and 11, and therefore designed to fit the bearings 13 during final assembly, the two housing sections may be slipped over the axle after the bearings have been assembled in place thereon, and after the pinion 19 has been assembled in the drum extension 15 prior to assembly of the housings on the axle. Recess 12a is provided to permit free passage of the bearing 16 and inner end of drum extension 15 over journal bearing 13. If, for example, the housing section 9 is assembled on the axle first, the bearing ring 7 is in plain view, and the bolts 8 may be easily put in place. The assembly may be checked at this stage, and if corrections as to the axial location of the bearing 4 are necessary axial spacers in the form of shims 21 are placed between the ring 7 and the housing flange 10.

The outer ends of the housing sections 9 and 11 are closed by plates 22 which have integral sleeve-like formations 23 which coact with sealing means to prevent escape of lubricant out the ends of the housing. The seals are more or less schematically shown at 24. The outer end of the extension 15 is likewise closed by a plate 25 having a sleeve-like formation 26 contacting the stem 27 of the coupling member 20. A sealing means, designated 28, is associated with the plate 25 to prevent lubricant from escaping through the extension 15.

The drum 12 is filled with lubricating oil to a level approximately indicated by the line 29. This oil is splashed by the hypoid gear 3 and the mist caused by the splashing action lubricates the bearings 16, the bearing 13 in the housing portion 11 and the bearing 4. Some of the oil is also splashed through the bearing 4 and accumulates in the housing portion 9. The oil splashed into the housing portion 11 may flow freely back into the drum 10, and that which is splashed into the outer portion of the housing extension 15 is conveyed back to the drum by means of channels 30 formed in the wall thereof.

The oil which is splashed through the bearing 4 into the housing portion 9 is returned to the drum 12 by two oil passages 31. These oil return passages are cored in the metal of the housing portion 9 and the flange 10, and as may be seen in Fig. 2, are disposed with one behind and one in front of the axle. This arrangement of the oil returns maintains a safe maximum oil level in the portion 9 during travel on horizontal tracks and prevents excessively high levels on grades.

Although a specific embodiment of the invention has been illustrated and described, it will be understood that various changes may be made within the scope of the appended claims without departing from the spirit of the invention, and such changes are contemplated.

What is claimed is:

1. An axle assembly for a rail vehicle, comprising a housing formed in two sections, an axle shaft having a gear fixed thereon, a thrust bearing secured against axial movement relative to said axle shaft, removable means for securing said bearing against movement axially of one of said sections, a pinion gear rotatably journalled in the other housing section and so disposed that attachment of the two sections together disposes the pinion in mesh with the gear, means for securing the two sections together, and journal bearings mounted on the outer ends of said axle shaft and received in portions of respective housing sections, said last named portions being of a diameter smaller than the remainder of the sections whereby the sections when detached may be removed from the axle without removing said journal bearings upon removal of said removable means.

2. An axle assembly comprising an axle shaft having a gear fixed thereon, a thrust bearing secured against axial movement on said shaft, journal bearings mounted on said axle shaft adjacent its ends, a housing section having a portion receiving the journal bearing at one end of the axle shaft and a second portion receiving the thrust bearing, means detachably securing said thrust bearing directly to said second portion, a second housing section having a portion receiving the other journal bearing and a drum formation for housing said gear, both of said journal bearing receiving portions having the smallest internal diameter of any part of respective housing sections whereby said journal bearings remain with said axle shaft upon removal of said housing sections, a pinion gear rotatably journalled in said second section, and means detachably securing said sections together, said last named means being so correlated with said thrust bearing that attachment of the sections together places said gears in correct mesh.

3. An axle assembly for a rail vehicle comprising a housing formed of multiple sections, an axle shaft having a gear fixed thereon, a center bearing on said shaft, a ring encircling said shaft and secured with respect thereto adjacent said center bearing, journal bearings on the ends of said axle shaft, one housing section being adapted to be slipped over the journal bearing at one end of the axle shaft and over said center bearing, a second ring on the side of said center bearing opposite the first named ring, means securing said second ring to said housing section to position the axle shaft axially with respect to said housing section, another section of said housing being adapted to be slipped over the remaining journal bearing and having an enlarged portion adapted to house said gear, a driving pinion rotatably journalled in said second named section in a position such that when the two sections are secured together the pinion meshes with said gear, and means for securing the sections together.

4. An axle assembly for a rail vehicle comprising a housing formed of multiple sections, an axle shaft having a gear fixed thereon, a center bearing on said shaft, a ring encircling said shaft and secured with respect thereto adjacent said center bearing, journal bearings on the ends of said axle shaft, one housing section being adapted to be slipped over the journal bearing at one end of the axle shaft and over said center bearing, a second ring on the side of said center bearing opposite the first named ring, means securing said second ring to said housing section to position the axle shaft axially with respect to said housing section, means for adjusting the position of said ring axially relative to said housing section, another section of said housing being adapted to be slipped over the remaining journal bearing and having an enlarged portion adapted to house said gear, a driving pinion rotatably journalled in said second named section in a position such that when the two sections are secured together the pinion meshes with said gear, and means for securing the sections together.

EMIL H. PIRON.